United States Patent
Jung et al.

(10) Patent No.: US 12,430,181 B2
(45) Date of Patent: Sep. 30, 2025

(54) METHOD AND APPARATUS FOR PARTITIONING NEURAL NETWORK DATA

(71) Applicant: SAMSUNG ELECTRONICS CO., LTD., Suwon-si (KR)

(72) Inventors: Hanwoong Jung, Seoul (KR); Joonho Song, Hwaseong-si (KR); Seungwon Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 322 days.

(21) Appl. No.: 17/467,890

(22) Filed: Sep. 7, 2021

(65) Prior Publication Data

US 2022/0179714 A1  Jun. 9, 2022

(30) Foreign Application Priority Data

Dec. 3, 2020  (KR) .................. 10-2020-0167681

(51) Int. Cl.
*G06F 9/48* (2006.01)
*G06F 9/50* (2006.01)
*G06N 3/063* (2023.01)

(52) U.S. Cl.
CPC .......... *G06F 9/5061* (2013.01); *G06F 9/4881* (2013.01); *G06N 3/063* (2013.01)

(58) Field of Classification Search
CPC .............................. G06F 9/4881; G06N 3/063
See application file for complete search history.

(56) References Cited

U.S. PATENT DOCUMENTS

| | | |
|---|---|---|
| 10,223,333 B2 | 3/2019 | Chetlur et al. |
| 10,417,555 B2 | 9/2019 | Brothers et al. |
| 2018/0322606 A1* | 11/2018 | Das .................. G06N 3/063 |
| 2018/0373976 A1* | 12/2018 | Woo .................. G06F 9/4881 |
| 2019/0340491 A1 | 11/2019 | Norden et al. |
| 2020/0104690 A1 | 4/2020 | Bai et al. |
| 2020/0293866 A1* | 9/2020 | Guo .................. G06F 16/9024 |
| 2020/0371835 A1* | 11/2020 | Chuang ............. G06F 9/4881 |
| 2021/0191765 A1* | 6/2021 | Bokam ............. G06F 30/20 |
| 2022/0147791 A1* | 5/2022 | Yao .................. G06N 3/0495 |

FOREIGN PATENT DOCUMENTS

| | | |
|---|---|---|
| KR | 10-2009-0094256 A | 9/2009 |
| KR | 10-2018-0062912 A | 6/2018 |
| KR | 10-2019-0018888 A | 2/2019 |

OTHER PUBLICATIONS

Li, Jiajun, et al., "SmartShuttle: Optimizing Off-Chip Memory Accesses for Deep Learning Accelerators", *2018 Design, Automation & Test in Europe Conference & Exhibition, IEEE*, 2018 (pp. 343-348).

* cited by examiner

*Primary Examiner* — Jacob Petranek
(74) *Attorney, Agent, or Firm* — NSIP Law

(57) ABSTRACT

A method and apparatus for scheduling a neural network operation. The method includes receiving data on a layer of a neural network, generating partitions to be assigned to cores by dividing the data, generating tiles by dividing the partitions, and scheduling an operation order of the tiles based on whether the data are shared between the cores.

20 Claims, 14 Drawing Sheets conv2_3x3_s1
Direction of division : IFM height
Number of tiles : 3
Divided IFM : (1, 32, 49, 149)

conv3_3x3_s1
Direction of division : IFM height
Number of tiles : 3
Divided IFM : (1, 32, 49, 147)

METHOD AND APPARATUS FOR PARTITIONING NEURAL NETWORK DATA

CROSS-REFERENCE TO RELATED APPLICATIONS

This application claims the benefit under 35 USC § 119(a) of Korean Patent Application No. 10-2020-0167681 filed on Dec. 3, 2020, in the Korean Intellectual Property Office, the entire disclosure of which is incorporated herein by reference for all purposes.

BACKGROUND

1. Field

The following description relates to a method and apparatus for scheduling a neural network operation.

2. Description of Related Art

When two or more independent neural processors desire to accelerate a neural network, the neural processors need to perform an operation by dividing a feature map or weight. In this case, redundant data exist between the neural processors, increasing the memory bandwidth.

When different neural processors divide one neural network and perform respective divided portions, synchronization between the neural processors is frequently performed to ensure operation and data copying, resulting in performance degradation.

When only a single neural processor is considered as in the conventional method, tile scheduling to hide a delay time and data copying between cores may not be considered. Therefore, there is a need for considering a method of appropriately dividing a given neural network for two or more processors and sub-network scheduling in the neural processors.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of scheduling a neural network operation includes receiving data on a layer of a neural network, generating partitions to be assigned to cores by dividing the data, generating tiles by dividing the partitions, and scheduling an operation order of the tiles based on whether the data are shared between the cores.

The data may include an input feature map of the layer or a weight of the layer.

The generating of the partitions may include generating the partitions based on a partitioning policy of a layer previous to the layer or a size of the data.

The generating of the partitions based on the partitioning policy of the previous layer or the size of the data may include generating the partitions based on the partitioning policy of the previous layer in response to an output of the previous layer being forwardable, and generating the partitions by comparing a size of an input feature map of the layer to a size of a weight of the layer in response to the output of the previous layer being unforwardable.

The generating of the partitions by comparing the size of the input feature map of the layer to the size of the weight of the layer in response to the output of the previous layer being unforwardable may include generating the partitions by comparing a loss caused by a memory size to a loss caused by unbalance in response to the input feature map or the weight being not uniformly divided and assigned to the cores.

The generating of the tiles may include generating the tiles based on a partitioning policy of a layer previous to the layer, a partitioning policy of the layer, a tile division policy of the previous layer, or a size of the data.

The generating of the tiles based on the partitioning policy of the previous layer, the partitioning policy of the layer, the tile division policy of the previous layer, or the size of the data may include generating the tiles based on the partitioning policy of the previous layer, the partitioning policy of the layer, and the tile division policy of the previous layer in response to an output of the previous layer being forwardable, and generating the tiles by comparing a size of an input feature map of the layer to a size of a weight of the layer in response to the output of the previous layer being unforwardable.

The generating of the partitions may include dividing the data in a height or width direction of the data.

The scheduling may include changing the operation order of the tiles based on whether operation results of the tiles are shared between the cores.

The changing of the operation order of the tiles based on whether the operation results of the tiles are shared between the cores may include changing the operation order so as to operate one tile included in the tiles with priority in response to an operation result of the one tile being shared between a core to which the one tile is assigned and another core.

In another general aspect, an apparatus for scheduling a neural network operation includes a receiver configured to receive data on a layer of a neural network, and a processor configured to generate partitions to be assigned to cores by dividing the data, generate tiles by dividing the partitions, and schedule an operation order of the tiles based on whether the data are shared between the cores.

The data may include an input feature map of the layer or a weight of the layer.

The processor may be further configured to generate the partitions based on a partitioning policy of a layer previous to the layer or a size of the data.

The processor may be further configured to generate the partitions based on the partitioning policy of the previous layer in response to an output of the previous layer being forwardable, and generate the partitions by comparing a size of an input feature map of the layer to a size of a weight of the layer in response to the output of the previous layer being unforwardable.

The processor may be further configured to generate the partitions by comparing a loss caused by a memory size to a loss caused by unbalance in response to the input feature map or the weight being not uniformly divided and assigned to the cores.

The processor may be further configured to generate the tiles based on a partitioning policy of a layer previous to the layer, a partitioning policy of the layer, a tile division policy of the previous layer, or a size of the data.

The processor may be further configured to generate the tiles based on the partitioning policy of the previous layer, the partitioning policy of the layer, and the tile division policy of the previous layer in response to an output of the previous layer being forwardable, and generate the tiles by comparing a size of an input feature map of the layer to a size of a weight of the layer in response to the output of the previous layer being unforwardable.

The processor may be further configured to divide the data in a height or width direction of the data.

The processor may be further configured to change the operation order of the tiles based on whether operation results of the tiles are shared between the cores.

The processor may be further configured to change the operation order so as to operate one tile included in the tiles with priority in response to an operation result of the one tile being shared between a core to which the one tile is assigned and another core.

Other features and aspects will be apparent from the following detailed description, the drawings, and the claims.

Figure 1:
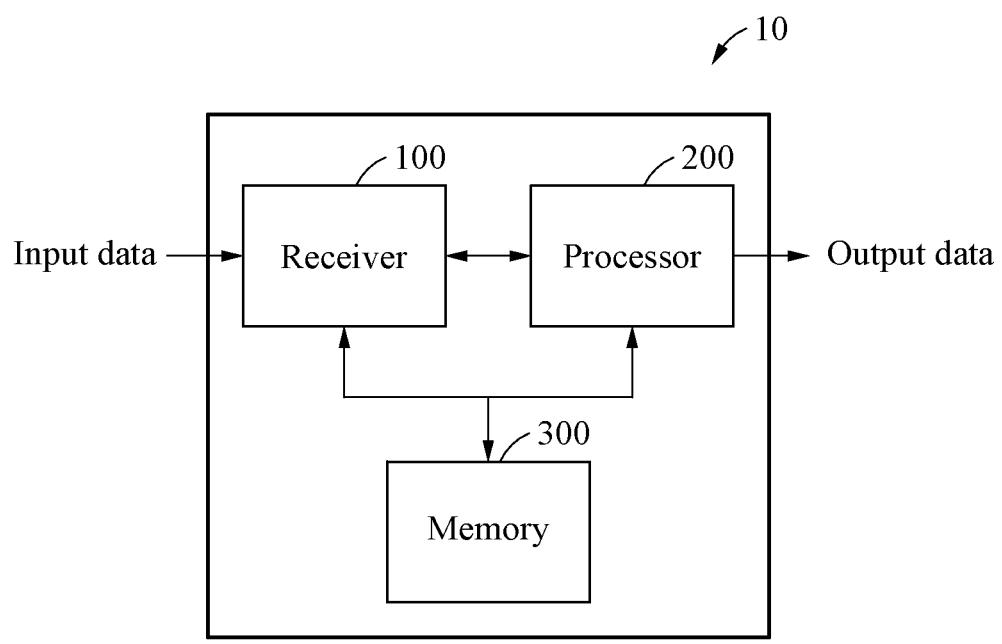
FIG. 1 illustrates an example of a neural network operation scheduling apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed structural or functional description is provided as an example only and various alterations and modifications may be made to the examples. Here, the examples are not construed as limited to the disclosure and should be understood to include all changes, equivalents, and replacements within the idea and the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, examples will be described in detail with reference to the accompanying drawings. When describing the examples with reference to the accompanying drawings, like reference numerals refer to like components and a repeated description related thereto will be omitted.

FIG. 1 illustrates an example of a neural network operation scheduling apparatus.

Referring to FIG. 1, a neural network operation scheduling apparatus 10 may perform scheduling for a neural network operation. The neural network operation scheduling apparatus 10 may perform scheduling by dividing the neural network operation and assigning the divided neural network operation to neural processors.

The neural network operation scheduling apparatus 10 may assign the neural network operation to the neural processors by receiving and dividing data on a layer of a neural network.

The data on the layer of the neural network may include an input feature map or a weight of the layer of the neural network.

The neural network (or an artificial neural network) may include a statistical training algorithm that simulates biological neurons in machine learning and cognitive science. The neural network may refer to a general model that has an ability to solve a problem, where artificial neurons (nodes) forming the network through synaptic combinations change a connection strength of synapses through training.

The neural network may include layers. A layer may include nodes.

The neural network may include a deep neural network (DNN). The neural network may include a convolutional neural network (CNN), a recurrent neural network (RNN), a perceptron, a feed forward (FF), a radial basis network (RBF), a deep feed forward (DFF), a long short-term memory (LSTM), a gated recurrent unit (GRU), an auto encoder (AE), a variational auto encoder (VAE), a denoising auto encoder (DAE), a sparse auto encoder (SAE), a Markov chain (MC), a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), and an attention network (AN).

The neural network operation scheduling apparatus 10 includes a receiver 100 and a processor 200. The neural network operation scheduling apparatus 10 may further include a memory 300.

The receiver 100 may receive the data on the layer of the neural network. The receiver 100 includes a receiving interface. The receiver 100 may receive the data on the layer of the neural network from an external device or the memory 300. The receiver 100 may output the received data to the processor 200.

The processor 200 may process data stored in the memory 300. The processor 200 may execute a computer-readable code (for example, software) stored in the memory 300 and instructions triggered by the processor 200.

The "processor 200" may be a data processing device implemented by hardware including a circuit having a physical structure to perform desired operations. For example, the desired operations may include instructions or codes included in a program.

For example, the hardware-implemented data processing device may include a microprocessor, a central processing unit (CPU), a processor core, a multi-core processor, a multiprocessor, an application-specific integrated circuit (ASIC), and a field-programmable gate array (FPGA).

The processor 200 may include neural processors. Alternatively, the processor 200 may be implemented separately from the neural processors. The neural processors may include cores.

The processor 200 may generate partitions to be assigned to the cores by dividing the data on the layer of the neural network. The processor 200 may generate the partitions based on a partitioning policy of a previous layer or a size of the data.

The processor 200 may divide the data in a height or width direction of the data. In addition, the processor 200 may divide the data based on a channel or batch of the data. In other words, the processor 200 may generate the partitions by dividing the data in the height, width, channel, or batch direction of the data.

The processor 200 may generate the partitions based on the partitioning policy of the previous layer in response to an output of the previous layer being forwardable.

The processor 200 may generate the partitions by comparing the size of the input feature map of the layer to the size of the weight of the layer in response to the output of the previous layer being unforwardable.

In this example, the processor 200 may generate the partitions by comparing a loss caused by a memory size to a loss caused by unbalance in response to the input feature map or the weight being not uniformly divided and assigned to the cores.

The processor 200 may generate tiles by dividing the generated partitions. The processor 200 may generate the tiles based on the partitioning policy of the previous layer, a partitioning policy of the layer, a tile division policy of the previous layer, or the size of the data.

The processor 200 may generate the tiles based on the partitioning policy of the previous layer, the partitioning policy of the layer, and the tile division policy of the previous layer in response to the output of the previous layer being forwardable.

The processor 200 may generate the tiles by comparing the size of the input feature map of the layer to the size of the weight of the layer in response to the output of the previous layer being unforwardable.

The processor 200 may generate the tiles by dividing the partitions in the height or width direction of the data.

The processor 200 may schedule an operation order of the tiles based on whether the data are shared between the cores. The processor 200 may change the operation order of the tiles based on whether operation results of the tiles are shared. The processor 200 may change the operation order so as to operate one tile included in the tiles with priority in response to an operation result of the one tile being shared between a core to which the one tile is assigned and another core.

The memory 300 may store instructions (or programs) executable by the processor 200. For example, the instructions may include instructions to perform an operation of the processor 200 and/or an operation of each element of the processor 200.

The memory 300 is implemented as a volatile memory device or a non-volatile memory device.

The volatile memory device may be implemented as a dynamic random access memory (DRAM), a static random access memory (SRAM), a thyristor RAM (T-RAM), a zero capacitor RAM (Z-RAM), or a Twin Transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM(CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), or an insulator resistance change memory.

Figure 2:
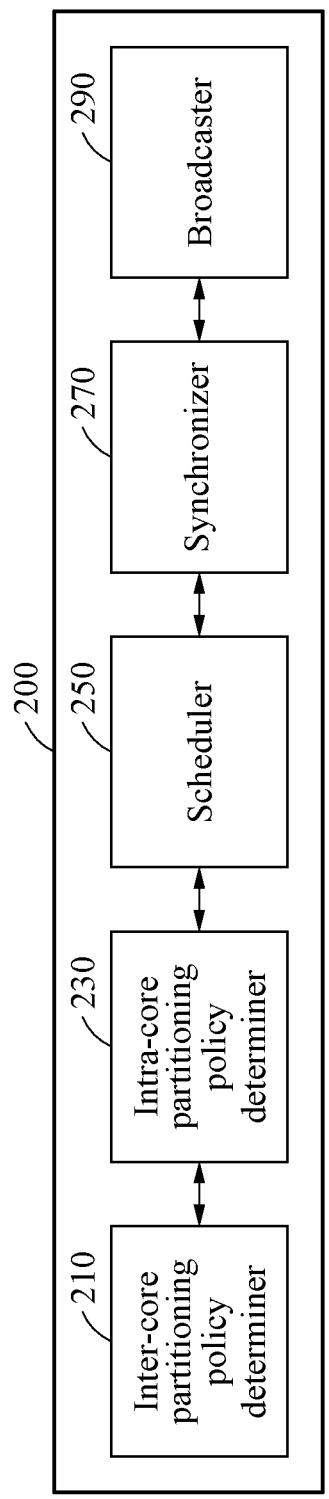
FIG. 2 illustrates an example of a processor shown in FIG. 1.

FIG. 2 illustrates an example of a processor shown in FIG. 1.

Referring to FIG. 2, the processor 200 may include an inter-core partitioning policy determiner 210, an intra-core partitioning policy determiner 230, and a scheduler 250. The processor 200 may further include a synchronizer 270 and a broadcaster 290.

The inter-core partitioning policy determiner 210 may generate partitions to be assigned to cores by dividing data on a layer of a neural network. The inter-core partitioning policy determiner 210 may determine an inter-core partitioning policy for dividing the data and divide the data according to the determined policy.

The inter-core partitioning policy may include information on a method of dividing the data on the layer of the neural network. For example, the inter-core partitioning policy may include a direction of division of the data, the number of partitions to be generated through division, and location information at which division of the data is performed. The operation of the inter-core partitioning policy determiner 210 will be described in detail with reference to FIGS. 5A to 6.

The intra-core partitioning policy determiner 230 may generate tiles by dividing the partitions generated through division of the data. The intra-core partitioning policy determiner 230 may determine an intra-core partitioning policy for dividing the partitions and divide the partitions according to the determined policy.

The intra-core partitioning policy may include information on a method of dividing the partitions. For example, the intra-core partitioning policy may include a direction of division of the partitions, the number of tiles to be generated through division, and location information at which division of the partitions is performed. The operation of the intra-core partitioning policy determiner 230 will be described in detail with reference to the operations of FIGS. 7A to 8.

The scheduler 250 may schedule an operation order of the divided tiles. The scheduler 250 may schedule the operation order of the tiles based on whether data are shared between the cores.

The scheduler 250 may perform scheduling by assigning the divided tiles to the cores and changing the operation order of the tiles.

The synchronizer 270 may perform synchronization between the cores. The synchronizer 270 may correct a synchronization request of the broadcaster 290 received from the cores and synchronization between the cores.

The broadcaster 290 may receive data from the memory 300 and broadcast the received data to the cores. The broadcaster 290 may transmit the received data to the cores through a single direct memory access (DMA).

The operation of the synchronizer 270 and the operation of the broadcaster 290 will be described in detail with reference to FIGS. 10 and 11.

Figure 3:
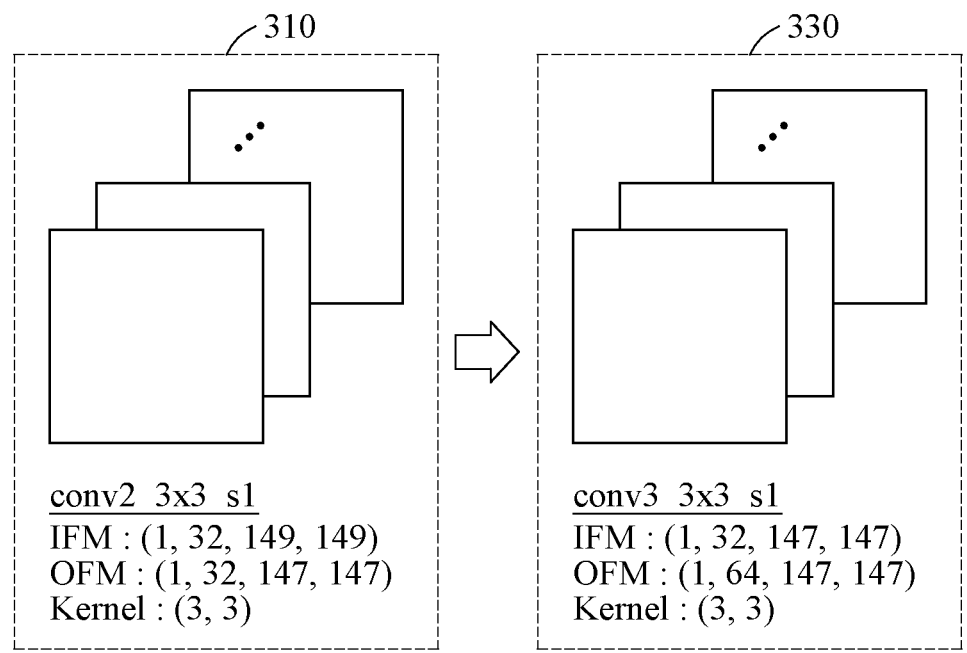
FIG. 3 illustrates examples of input and output data.
Figure 4:
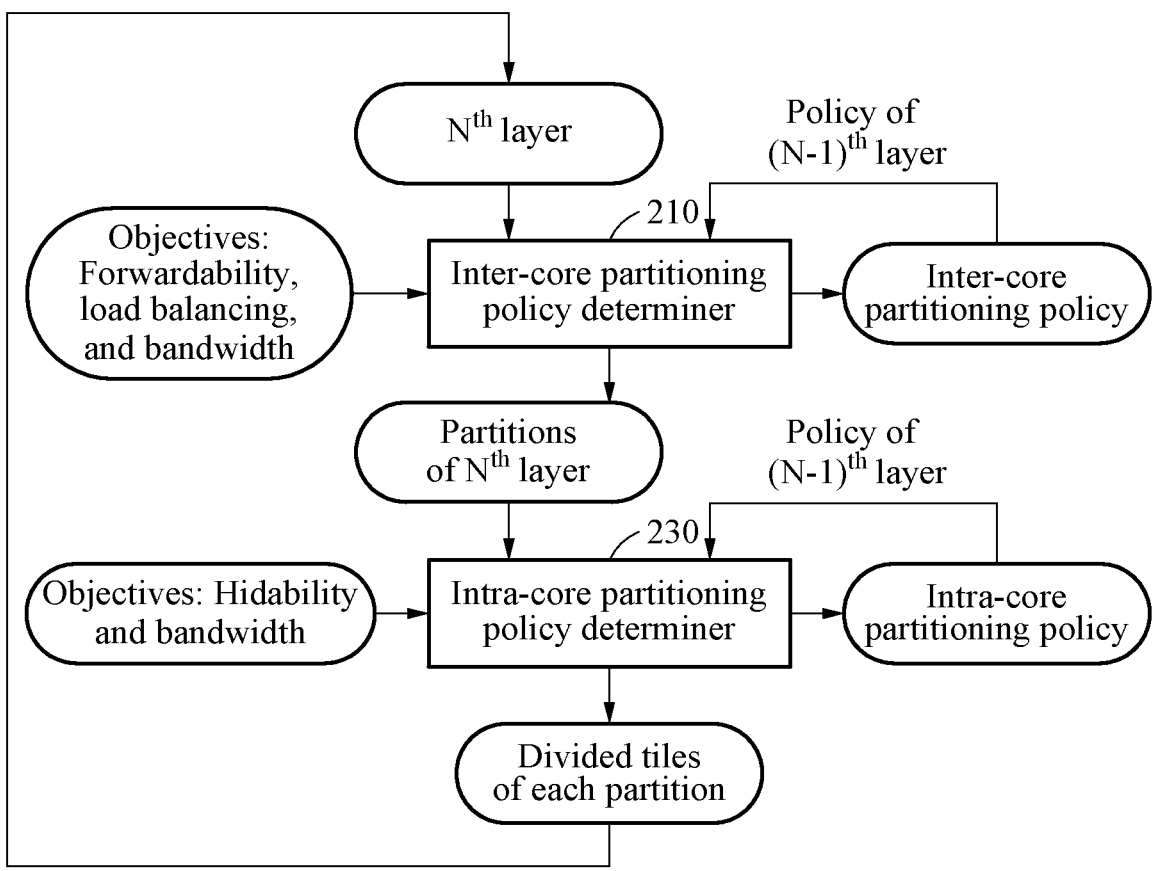
FIG. 4 illustrates an example of a flow of a division operation of the processor shown in FIG. 1.

FIG. 3 illustrates examples of input and output data, and FIG. 4 illustrates an example of a flow of a division operation of the processor shown in FIG. 1.

Referring to FIGS. 3 and 4, data on a layer of a neural network may include an input feature map (IFM) and a weight of a layer. FIG. 3 shows examples of feature maps.

Feature maps 310 and 330 may include channels, and each channel may be in the form of a two-dimensional (2D) matrix. That is, the feature maps 310 and 330 may have a height and a width.

For example, the feature map 310 may have 32 channels, a height of 149, and a width of 149, and the feature map 330 may have 32 channels, a height of 147, and a width of 147.

In this example, an output feature map (OFM) output after the feature map 310 passes through the layer may have 32 channels and a width of 147, and a height of 147. In addition, the output of the layer for the feature map 330 may have 64 channels, a height of 147, and a width of 147.

A kernel (or weight filter) of the layer for processing the feature map 310 and the feature map 330 may be in the form of a 3×3 matrix.

The inter-core partitioning policy determiner 210 may generate partitions by dividing the input feature map or weight. The inter-core partitioning policy determiner 210 may receive an Nth layer (or data of Nth layer) and determine a partitioning policy for the data on the Nth layer.

The objectives of the partitioning policy may include assuring forwardability, load balancing, and bandwidth. Forwardability may refer to reusing an IFM of a subsequent layer while storing an OFM of a previous layer in a local memory, rather than handing over the OFM of the previous layer from the local memory (e.g., SRAM) to a global memory (e.g, DRAM).

The processor 200 may determine an inter-core partitioning policy and an intra-core partitioning policy to reduce latency and demanded bandwidth, considering forwardability.

Load balancing may refer to uniformly assigning a task (e.g., operation) to cores.

The bandwidth may include memory bandwidth. The memory bandwidth may refer to the rate at which a neural processor (e.g., core) reads data from or stores data in the memory 300.

The inter-core partitioning policy determiner 210 may determine the partitioning policy for the data to assure forwardability, load balancing, and bandwidth. The inter-core partitioning policy determiner 210 may use an (N−1)th partitioning policy to determine the partitioning policy of the Nth layer. The inter-core partitioning policy determiner 210 may generate partitions by dividing the data on the Nth layer based on the determined partitioning policy.

The data partitioning operation of the inter-core partitioning policy determiner 210 will be described in detail with reference to FIGS. 5A to 6.

The intra-core partitioning policy determiner 230 may determine an intra-core partitioning policy. The intra-core partitioning policy determiner 230 may generate tiles by dividing the generated partitions based on the determined intra-core partitioning policy.

The objectives of the intra-core partitioning policy may include hiding a halo area and assuring bandwidth. The halo area may refer to an area or transmission time of data to be transmitted from one core to another core to perform an operation of a subsequent layer.

The intra-core partitioning policy determiner 230 may determine the intra-core partitioning policy for dividing the partitions to hide the halo area and assure the bandwidth. The intra-core partitioning policy determiner 230 may use the intra-core partitioning policy of the (N−1)th layer and the inter-core partitioning policy of the Nth layer to divide the partitions of the Nth layer.

The operation of the intra-core partitioning policy determiner 230 will be described in detail with reference to FIGS. 7A to 8.

Hereinafter, the operation of the inter-core partitioning policy determiner 210 will be described in detail with reference to FIGS. 5A to 6.

Figure 5A:
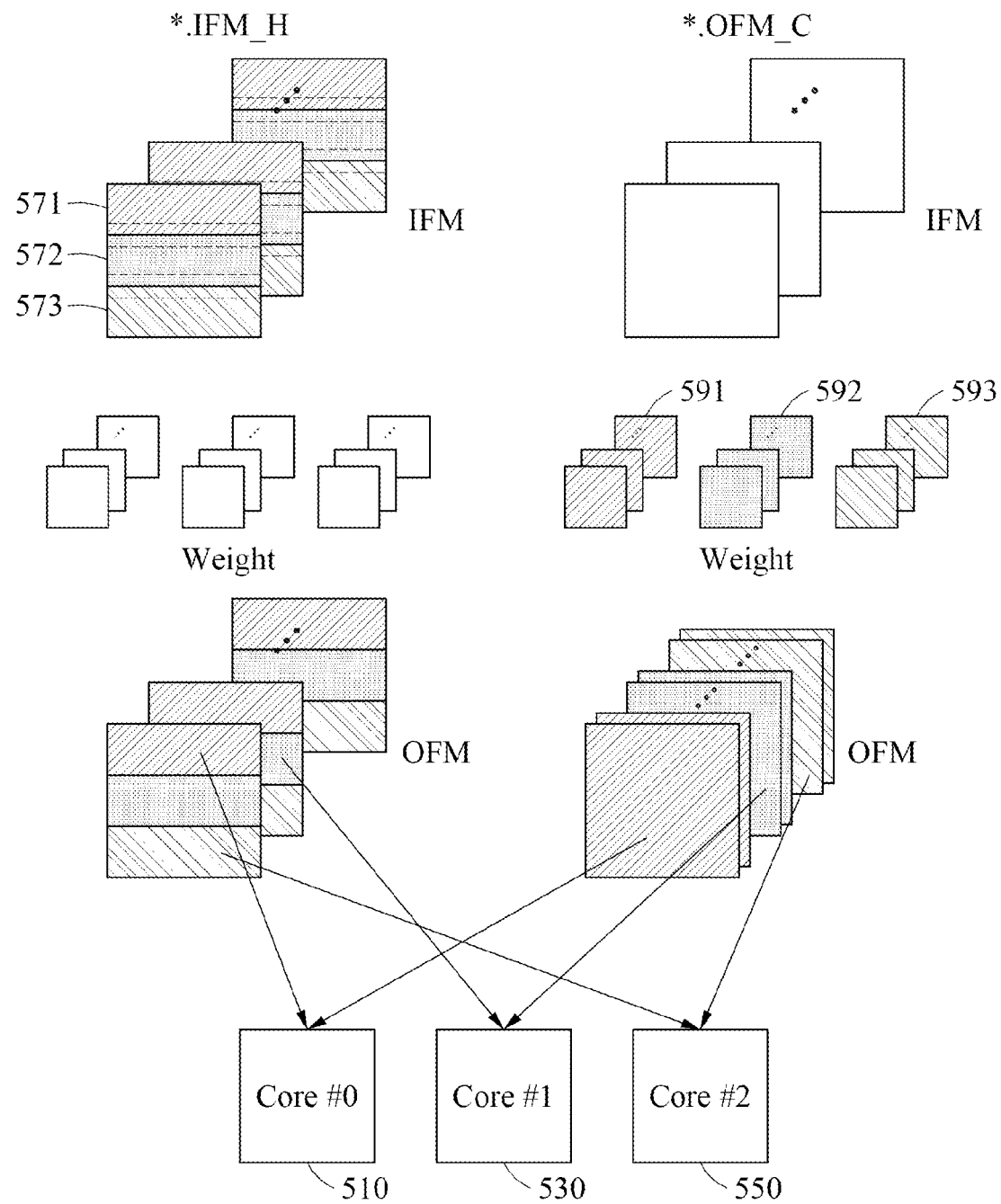
FIG. 5A illustrates an example of dividing data and assigning the divided data to cores.
Figure 5B:
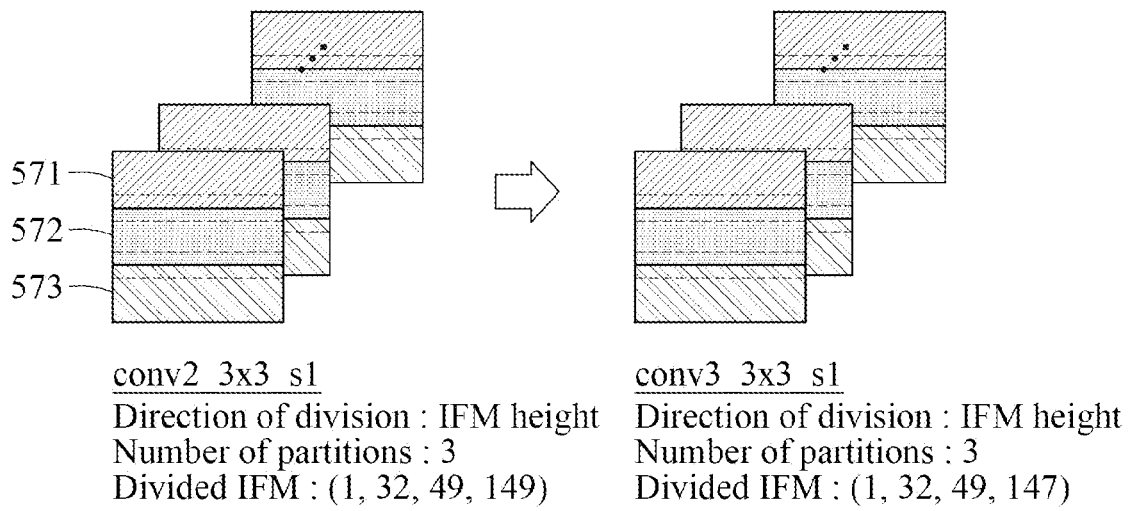
FIG. 5B illustrates an example of data division.
Figure 6:
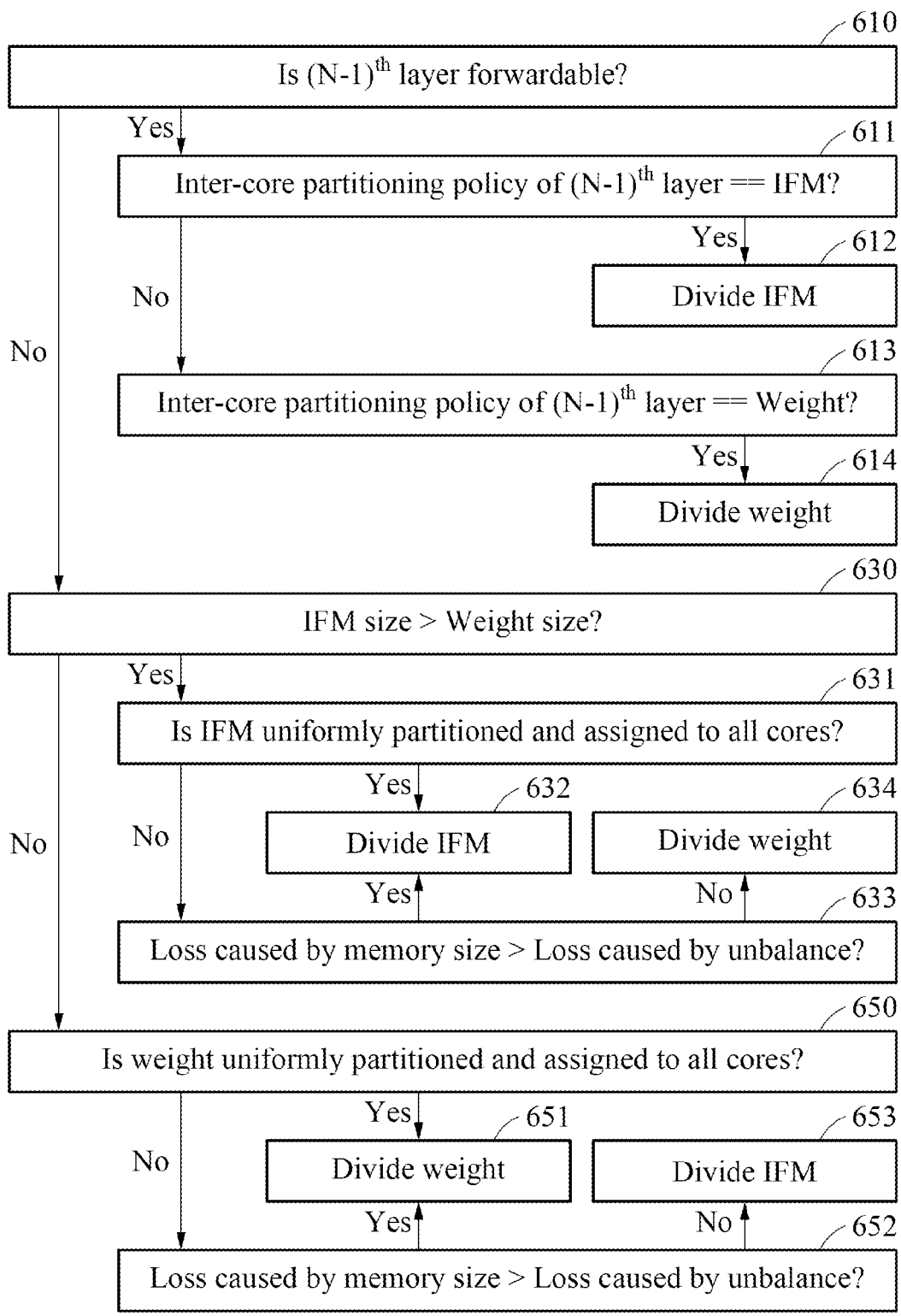
FIG. 6 illustrates an example of a flow of operation of dividing data.

FIG. 5A illustrates an example of dividing data and assigning the divided data to cores, FIG. 5B illustrates an example of data division, and FIG. 6 illustrates an example of a flow of operation of dividing data.

Referring to FIGS. 5A, 5B, and 6, the inter-core partitioning policy determiner 210 may generate partitions by dividing data on a layer of a neural network. In this case, the partitions may be assigned to cores 510, 530, and 550.

One core may correspond to one neural processor. A neural processor may include a core and SRAM. An example of hardware implementation of the neural processor will be described in detail with reference to FIG. 10.

The inter-core partitioning policy determiner 210 may generate partitions 571, 572, and 573 by dividing an input feature map of the layer. Further, the inter-core partitioning policy determiner 210 may generate partitions by dividing weights 591, 592, and 593 of the layer.

The inter-core partitioning policy determiner 210 may generate the partitions 571, 572, and 573 by dividing the input feature map in a height, width, channel, or batch direction. Although the input feature map is divided in the height direction in the examples of FIGS. 5A and 5B, the input feature map may be divided in the width, channel, or batch direction in some examples.

The inter-core partitioning policy determiner 210 may generate the partitions by dividing the weights 591, 592, and 593 so as to assign the divided weights 591, 592, and 593 to different cores. When the weights 591, 592, and 593 are divided, one piece of input data may be transmitted to all the cores 510, 530, and 550.

Although the weights 591, 592, and 593 are divided according to respective kernel in the example of FIG. 5A, the weights 591, 592, and 593 may be divided in the height, width, channel, or batch direction in some examples.

Specifically, in operation 610, the inter-core partitioning policy determiner 210 may determine whether an (N−1)th layer is forwardable. That is, the inter-core partitioning policy determiner 210 may determine whether an operation for the current layer is performable while maintaining the partitioning policy and scheduling method of the previous layer.

In response to the (N−1)th layer being forwardable, the inter-core partitioning policy determiner 210 may determine whether the inter-core partitioning policy of the (N−1)th layer is to divide the input feature map, in operation 611. In response to the inter-core partitioning policy of the (N−1)th layer being to divide the input feature map, the inter-core partitioning policy determiner 210 may divide the input feature map of the Nth layer, in operation 612.

In response to the inter-core partitioning policy of the (N−1)th layer being not to divide the input feature map, the inter-core partitioning policy determiner 210 may determine whether the inter-core partitioning policy of the (N−1)th layer is to divide the weight, in operation 613. In response to the inter-core partitioning policy of the (N−1)th layer being to divide the weight, the inter-core partitioning policy determiner 210 may generate partitions by dividing the weight of the Nth layer, in operation 614.

In response to the (N−1)th layer being unforwardable, the inter-core partitioning policy determiner 210 may compare the size of the input feature map to the size of the weight, in operation 630. In this case, the size may be the memory size.

In response to the size of the input feature map being greater than the size of the weight, the inter-core partitioning policy determiner 210 may determine whether the input feature map can be uniformly partitioned and assigned to all cores, in operation 631.

In response to the determination that the input feature map can be uniformly partitioned and assigned to all the cores, the inter-core partitioning policy determiner 210 may divide the input feature map, in operation 632. In response to the determination that the input feature map cannot be uniformly partitioned and assigned to all the cores, the inter-core partitioning policy determiner 210 may compare a loss caused by the memory size and a loss caused by unbalance, in operation 633.

In response to the loss caused by the memory size being greater than the loss caused by unbalance, the inter-core partitioning policy determiner 210 may divide the input feature map, in operation 632. In response to the loss caused by the memory size being not greater than the loss caused by unbalance, the inter-core partitioning policy determiner 210 may divide the weight, in operation 634.

In response to the size of the input feature map being not greater than the size of the weight, the inter-core partitioning policy determiner 210 may determine whether the weight can be uniformly partitioned and assigned to all cores, in operation 650.

In response to the determination that the weight can be uniformly partitioned and assigned to all the cores, the inter-core partitioning policy determiner 210 may divide the weight, in operation 651. In response to the determination that the weight cannot be uniformly partitioned and assigned to all the cores, the inter-core partitioning policy determiner 210 may compare a loss caused by the memory size and a loss caused by unbalance, in operation 652.

In this case, in response to the loss caused by the memory size being greater than the loss caused by unbalance, the inter-core partitioning policy determiner 210 may divide the weight, in operation 651. In response to the loss caused by the memory size being not greater than the loss caused by unbalance, the inter-core partitioning policy determiner 210 may divide the input feature map, in operation 653.

The inter-core partitioning policy determiner 210 may consider with top priority whether a feature map of a previous layer is forwardable, and if unforwardable, determine a partitioning policy to minimize demanded bandwidth.

The inter-core partitioning policy determiner 210 may determine a partitioning policy to maximize the efficiency of utilizing an operator, considering whether an operation amount as equal as possible can be distributed to each core in view of the operation characteristics of the operator.

Hereinafter, the operation of the intra-core partitioning policy determiner 230 will be described in detail with reference to FIGS. 7A, 7B, and 8.

Figure 7A:
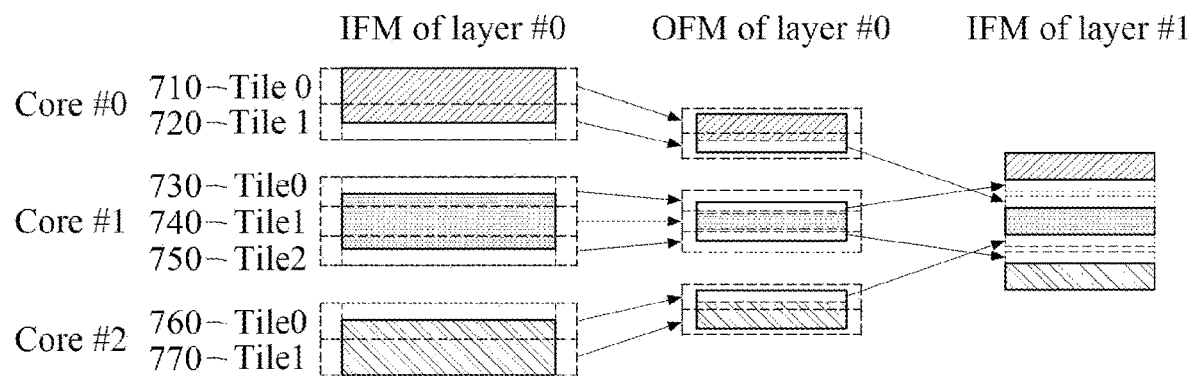
FIG. 7A illustrates an example of dividing partitions assigned to cores.
Figure 7B:
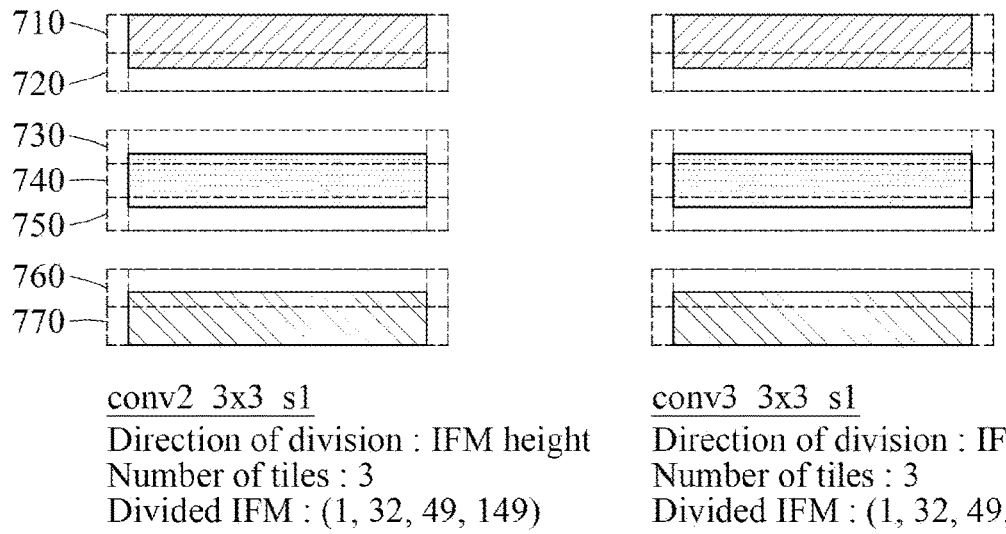
FIG. 7B illustrates an example of partition division.
Figure 8:
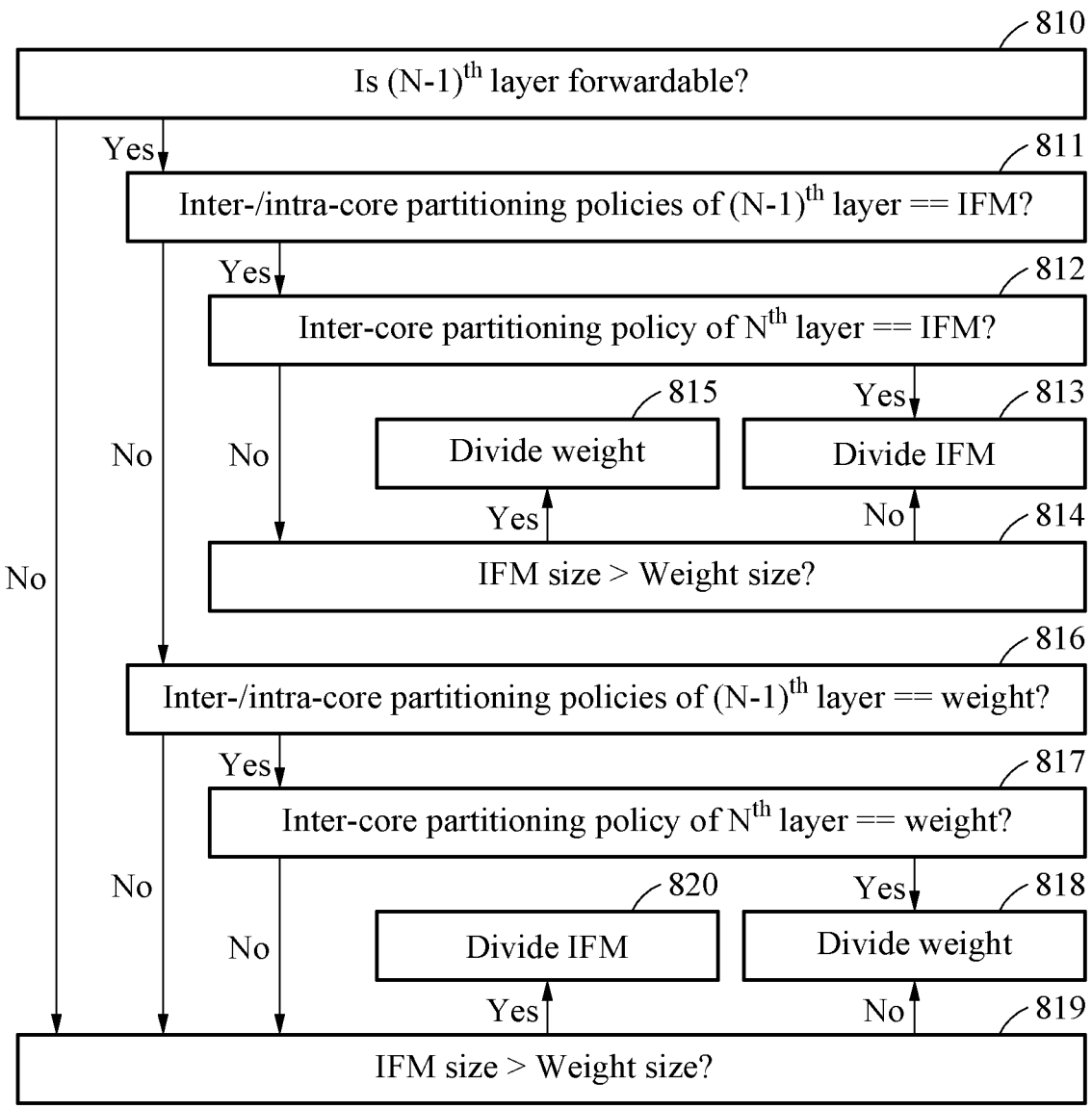
FIG. 8 illustrates an example of a flow of operation of dividing partitions.

FIG. 7A illustrates an example of dividing partitions assigned to cores, FIG. 7B illustrates an example of partition division, and FIG. 8 illustrates an example of a flow of operation of dividing partitions.

Referring to FIGS. 7A to 8, the intra-core partitioning policy determiner 230 may generate tiles 710 to 770 by dividing partitions. The intra-core partitioning policy determiner 230 may generate the tiles 710, 720, 730, 740, 750, 760, and 770 by dividing the partitions assigned to cores.

The intra-core partitioning policy determiner 230 may generate the tiles 710 to 770 by dividing the partitions in a height, width, channel, or batch direction.

The tiles 710 to 770 shown in FIGS. 7A and 7B may be examples of divided tiles. Although the tiles 710 to 770 are generated by dividing the partitions, which are divided in the height direction, in the height direction, the tiles 710 to 770 may be generated by dividing the partitions in a different direction in some examples.

The intra-core partitioning policy determiner 230 may generate the tiles based on a partitioning policy of a layer previous to a current layer, a partitioning policy of the current layer, a tile division policy of the previous layer, or a size of data.

The intra-core partitioning policy determiner 230 may generate the tiles based on the partitioning policy of the previous layer, the partitioning policy of the layer, and the tile division policy of the previous layer in response to an output of the previous layer being forwardable.

The intra-core partitioning policy determiner 230 may generate the tiles by comparing the size of an input feature map of the layer to the size of a weight of the layer in response to the output of the previous layer being unforwardable.

Specifically, in operation 810, the intra-core partitioning policy determiner 230 may determine whether an (N−1)th layer is forwardable. That is, the intra-core partitioning policy determiner 230 may determine whether an operation for the current layer is performable while maintaining the partitioning policy and scheduling method of the previous layer.

In response to the (N−1)th layer being forwardable, the intra-core partitioning policy determiner 230 may determine whether an inter-core partitioning policy and an intra-core partitioning policy of the (N−1)th layer is to divide the input feature map, in operation 811.

In response to the inter-core partitioning policy and the intra-core partitioning policy of the (N−1)th layer being to divide the input feature map, the intra-core partitioning policy determiner 230 may determine whether an inter-core partitioning policy of an Nth layer is to divide the input feature map, in operation 812.

In response to the inter-core partitioning policy of the Nth layer being to divide the input feature map, the intra-core partitioning policy determiner 230 may generate tiles by dividing the input feature map of the Nth layer, in operation 813.

In response to the inter-core partitioning policy of the Nth layer being not to divide the input feature map, the intra-core partitioning policy determiner 230 may compare the size of the input feature map to the size of the weight, in operation 814.

In response to the size of the input feature map being greater than the size of the weight, the intra-core partitioning policy determiner 230 may generate the tiles by dividing the weight, in operation 815. In response to the size of the input feature map being not greater than the size of the weight, the intra-core partitioning policy determiner 230 may divide the input feature map, in operation 813.

In response to the inter-core partitioning policy and the intra-core partitioning policy of the (N−1)th layer being not to divide the input feature map, the intra-core partitioning policy determiner 230 may determine whether the inter-core partitioning policy and the intra-core partitioning policy of the (N−1)th layer is to divide the weight, in operation 816.

In response to the inter-core partitioning policy and the intra-core partitioning policy of the (N−1)th layer being to divide the weight, the intra-core partitioning policy determiner 230 may determine whether the inter-core partitioning policy of the Nth layer is to divide the weight, in operation 817.

In response to the inter-core partitioning policy of the Nth layer being to divide the weight, the intra-core partitioning policy determiner 230 may generate the tiles by dividing the weight, in operation 818.

In response to the inter-core partitioning policy of the Nth layer being not to divide the weight, the intra-core partitioning policy determiner 230 may compare the size of the input feature map to the size of the weight, in operation 819.

In response to the size of the input feature map being greater than the size of the weight, the intra-core partitioning policy determiner 230 may divide the input feature map, in operation 820. In response to the size of the input feature map being not greater than the size of the weight, the intra-core partitioning policy determiner 230 may divide the weight, in operation 818.

The intra-core partitioning policy determiner 230 may determine a method of dividing or scheduling the partitions to hide an inter-core direct memory access (DMA) delay time, considering the inter-/intra-core partitioning policies of the previous layer and the inter-core partitioning policy of the current layer.

In response to the previous layer being unforwardable, the intra-core partitioning policy determiner 230 may generate the tiles 710 to 770 by dividing the partitions, considering the bandwidth with top priority.

Figure 9A:
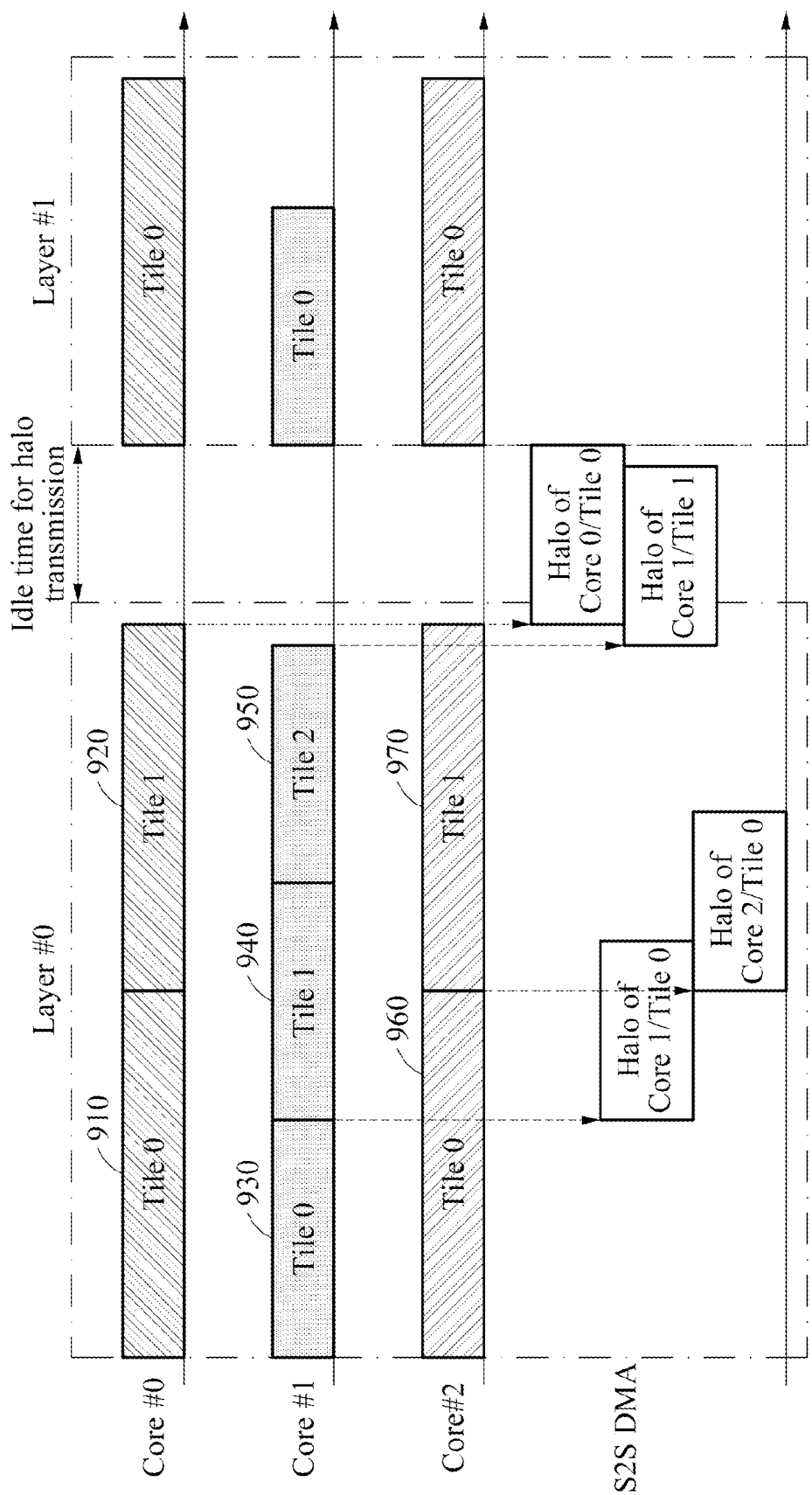
FIG. 9A illustrates an example of a scheduling result in which an inter-core data transmission delay time is not hidden.
Figure 9B:
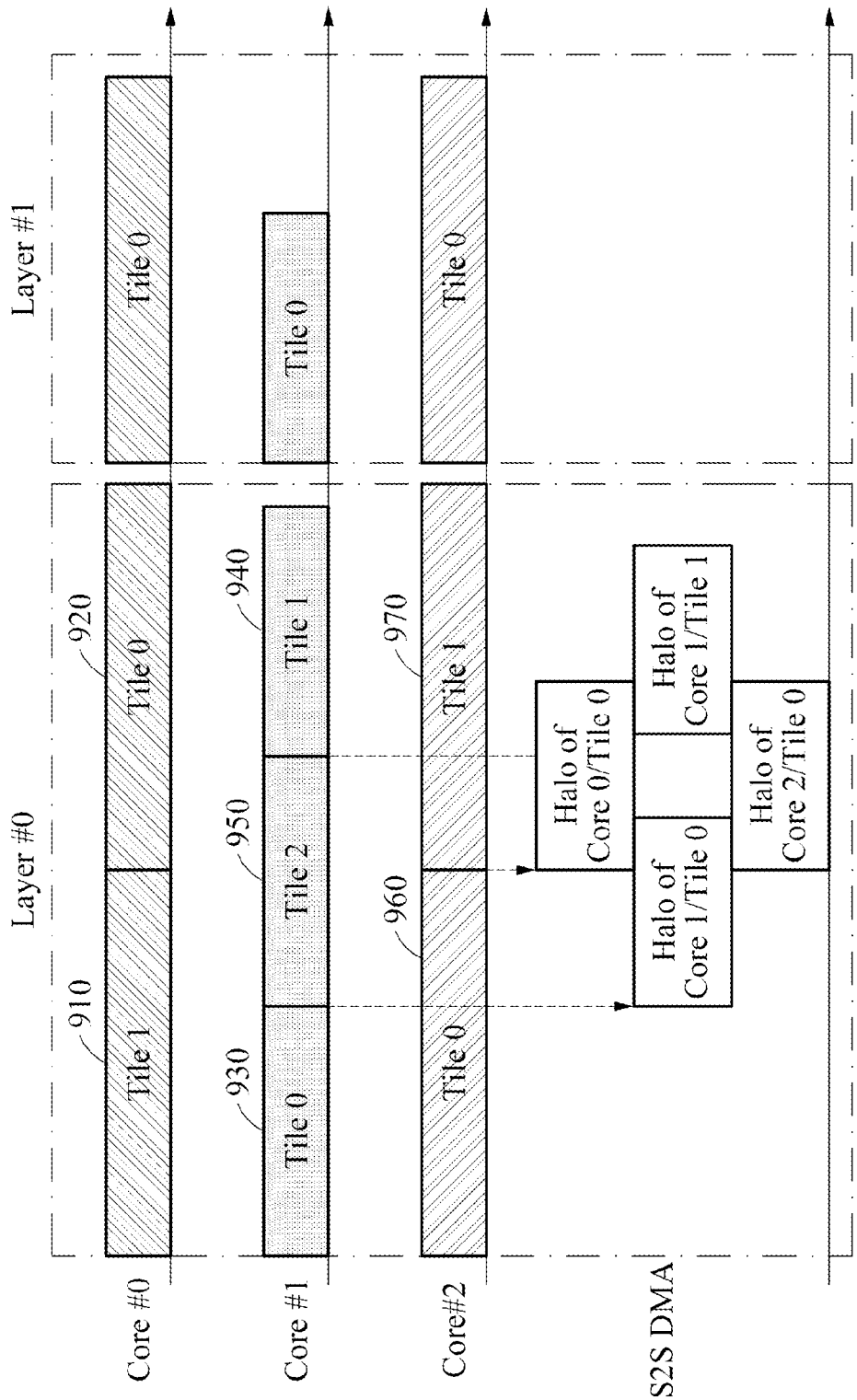
FIG. 9B illustrates an example of a scheduling result in which an inter-core data transmission delay time is hidden.

FIG. 9A illustrates an example of a scheduling result in which an inter-core data transmission delay time is not hidden, and FIG. 9B illustrates an example of a scheduling result in which an inter-core data transmission delay time is hidden.

The scheduler 250 may schedule an operation order of tiles 910, 920, 930, 940, 950, 960, and 970 based on whether data are shared between cores. The scheduler 250 may change the operation order of the tiles 910 to 970 based on whether operation results of the tiles 910 to 970 are shared.

The scheduler 250 may change the operation order so as to operate one tile included in the tiles with priority in response to an operation result of the one tile being shared between a core to which the one tile is assigned and another core.

FIG. 9A shows a schedule in which the operation order of the tiles 910 to 970 is not changed by the scheduler 250, and FIG. 9B shows a schedule after the operation order of the tiles 910 to 970 is changed by the scheduler 250.

The scheduler 250 may maximize the reusability of data broadcast to neural processors, and if feature map data are shared with an adjacent layer, schedule the operation order of the tiles 910 to 970 so as to hide an inter-core data transmission delay time.

When a neural network operation is performed using the cores, data sharing between the cores may be required. For example, there may be a case in which a result of operation performed by core #0 is used for an operation performed by core #1. A halo area may be an inter-core data transmission delay time.

The scheduler 250 may hide the halo area and the DMA time by performing an operation on a tile including the halo area with priority and then performing an operation on another tile.

In other words, the scheduler 250 may perform the operation on the other tile through a core while a transmission delay occurs by changing the operation order of the tiles 910 to 970 such that the operation on the tile requiring inter-core data sharing is performed with priority, thereby improving the utilization of the cores.

In the example of FIG. 9A, when the scheduler 250 does not perform separate scheduling, an idle time for halo transmission may occur, reducing the utilization of the cores. The scheduler 250 may change the operation order of the tile 940 and the tile 950, thereby hiding a halo area while the operation on the other tile is performed.

Through the scheduling process described above, the neural network operation scheduling apparatus 10 may improve the utilization of all the cores.

Figure 10:
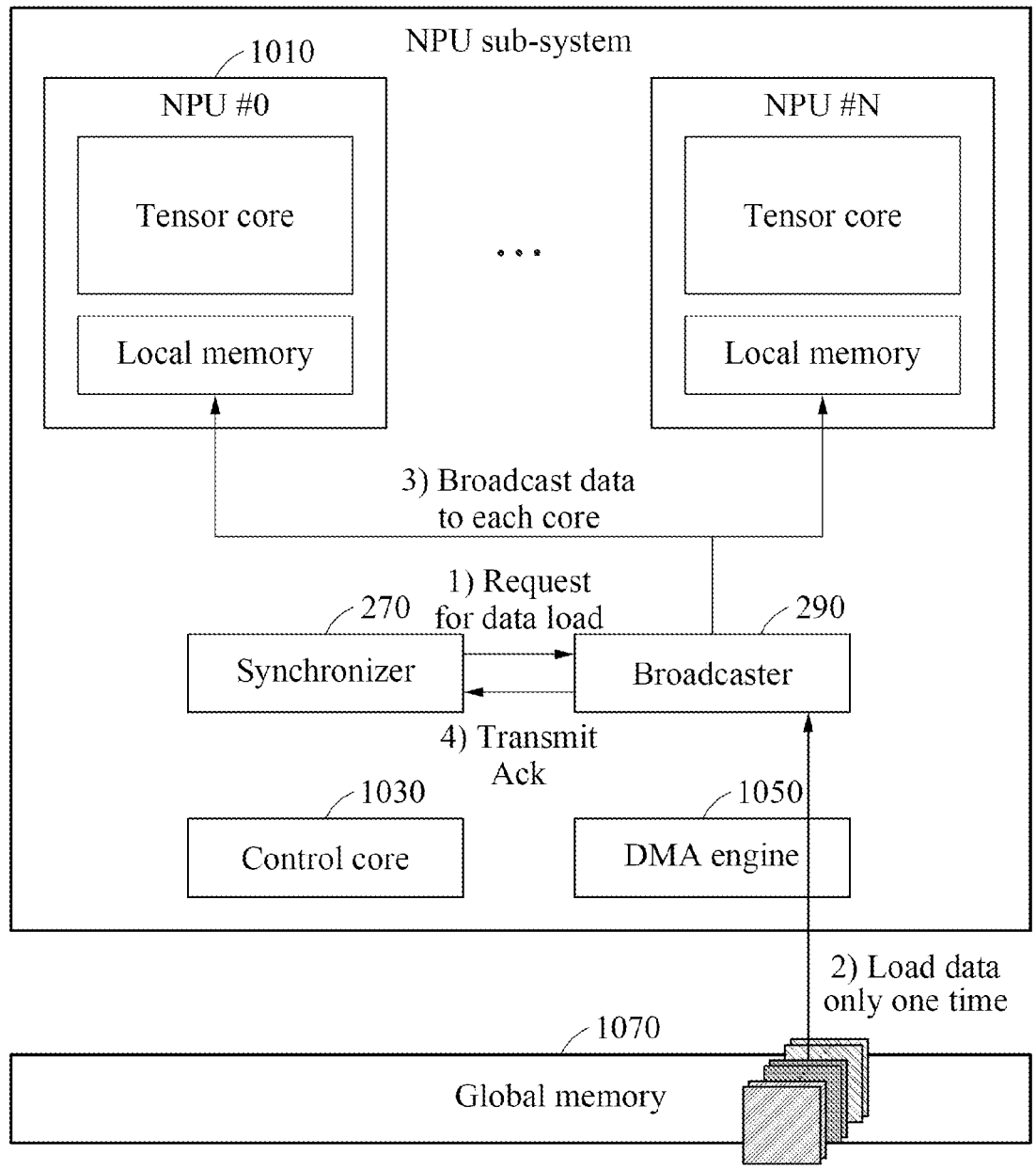
FIG. 10 illustrates an example of hardware implementation of a neural network operation scheduling apparatus.
Figure 11:
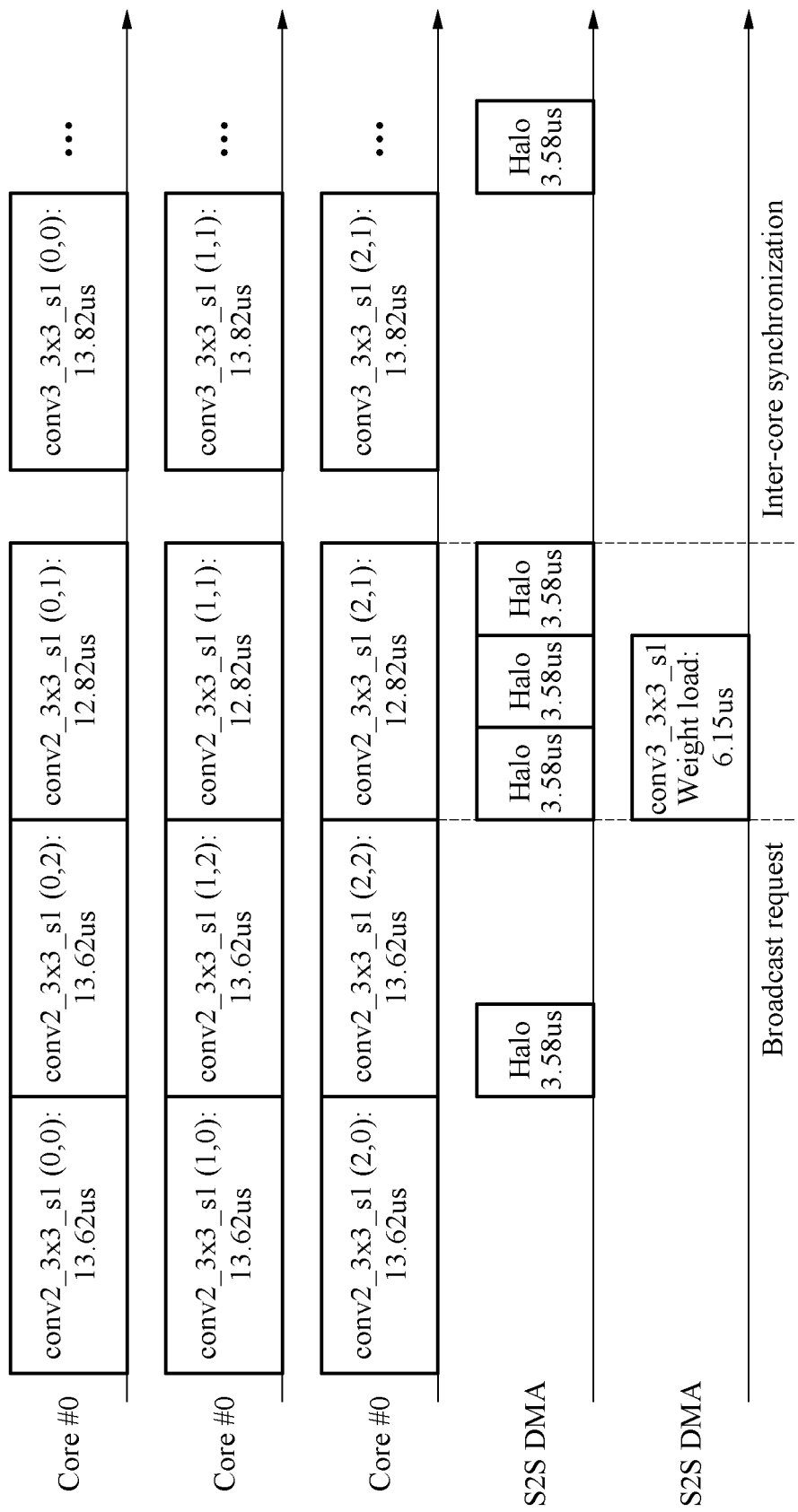
FIG. 11 illustrates an example of broadcasting and synchronization.

FIG. 10 illustrates an example of hardware implementation of a neural network operation scheduling apparatus, and FIG. 11 illustrates an example of broadcasting and synchronization.

Referring to FIGS. 10 and 11, the neural network operation scheduling apparatus 10 may include the synchronizer 270 and the broadcaster 290. The neural network operation scheduling apparatus 10 may further include neural processors 1010, a control core 1030, a DMA engine 1050, and a global memory 1070. For example, the global memory 1070 may include DRAM.

The neural processors 1010 may each include a tensor core and a local memory. For example, the local memory may include SRAM.

The synchronizer 270 and the broadcaster 290 may be implemented inside a processor or may be implemented as separate hardware modules.

The synchronizer 270 may perform synchronization between cores. The synchronizer 270 may guarantee synchronization between the cores and a request for broadcasting data received from the cores. The synchronizer 270 may reduce the number and cost of synchronizations between the cores.

For example, when the same data are copied to the local memories (e.g., SRAMs) of the respective cores through the broadcaster 290 at one time, the synchronizer 270 may synchronize the operations of the respective cores.

The synchronizer 270 may solve an issue in that operation times different between cores cause data copying to a memory area in use and affect the correctness or conversely in that frequent synchronization reduces the utilization of cores.

The synchronizer 270 may perform marking on hardware at a point in time when each core is ready to load data so as to perform a necessary operation again, and actually perform data copying when marking is completed for all the cores, thereby reducing the number of synchronizations while guaranteeing the exquisiteness of operation and thereby reducing the synchronization cost.

The broadcaster 290 may broadcast the data in the DRAM 1070 to each of the neural processors 1010. For example, the broadcaster 290 may transmit the data from DRAM to SRAM with a single DMA. Through this, the broadcaster 290 may reduce the demanded bandwidth of the system bus.

When the data and operation are divided in the height direction of the input feature map, the weight may be redundant and thus, copied to the local memory of each core. When the division is performed in the channel direction of the output feature map, the input feature map may be redundant and thus, copied. Copying of redundant data may greatly affect the demanded bandwidth of the system bus.

The broadcaster 290 may perform only one data copying through the system bus and copy the copied data to the local memory of each core, thereby preventing an increase in demanded bandwidth due to the redundant data movement.

Figure 12:
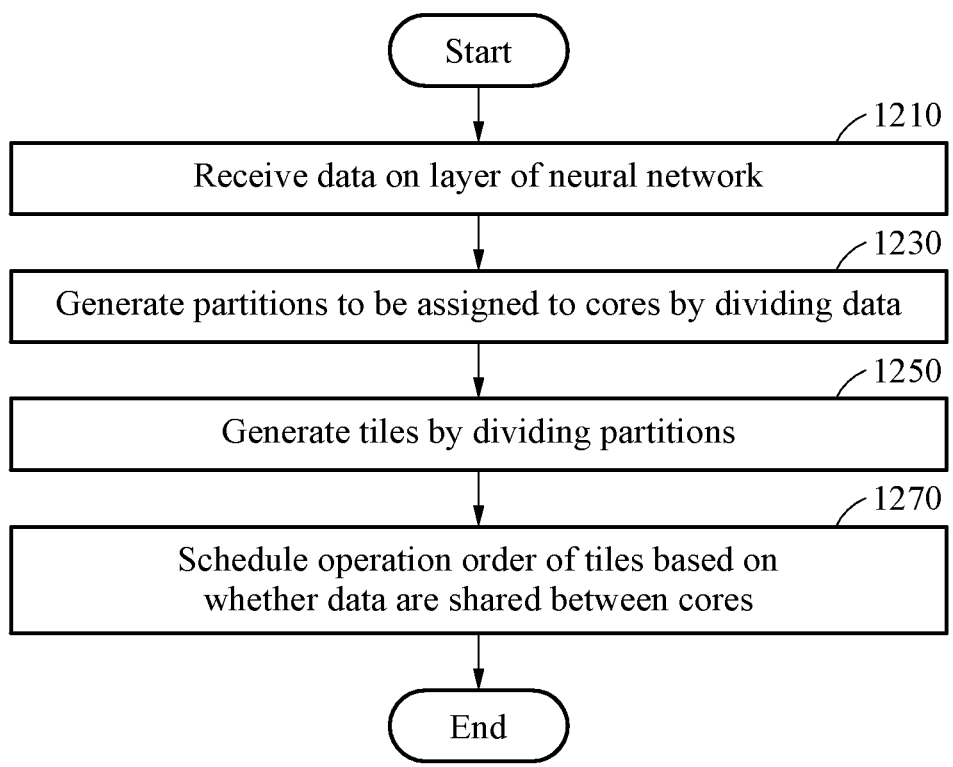
FIG. 12 illustrates an example of a flow of operation of the neural network operation scheduling apparatus of FIG. 1.

FIG. 12 illustrates an example of a flow of operation of the neural network operation scheduling apparatus of FIG. 1.

In operation 1210, the receiver 100 may receive data on a layer of a neural network. The data on the layer of the neural network may include an input feature map or a weight of the layer.

In operation 1230, the processor 200 may generate partitions to be assigned to cores by dividing the data on the layer. The processor 200 may generate the partitions based on a partitioning policy of a layer previous to the layer or a size of the data.

The processor 200 may generate the partitions based on the partitioning policy of the previous layer in response to an output of the previous layer being forwardable. The processor 200 may generate the partitions by comparing the size of the input feature map of the layer to the size of the weight of the layer in response to the output of the previous layer being unforwardable.

The processor 200 may generate the partitions by comparing a loss caused by a memory size to a loss caused by unbalance in response to the input feature map or the weight being not uniformly divided and assigned to the cores.

In operation 1250, the processor 200 may generate tiles by dividing the partitions. The processor 200 may generate the tiles based on the partitioning policy of the previous layer, a partitioning policy of the layer, a tile division policy of the previous layer, or the size of the data.

The processor 200 may generate the tiles based on the partitioning policy of the previous layer, the partitioning policy of the layer, and the tile division policy of the previous layer in response to the output of the previous layer being forwardable.

The processor 200 may generate the tiles by comparing the size of the input feature map of the layer to the size of the weight of the layer in response to the output of the previous layer being unforwardable.

The processor 200 may divide the data in a height or width direction of the data.

In operation 1270, the processor 200 may schedule an operation order of the tiles based on whether the data are shared between the cores. The processor 200 may change the operation order of the tiles based on whether operation results of the tiles are shared. The processor 200 may change the operation order so as to operate one tile included in the tiles with priority in response to an operation result of the one tile being shared between a core to which the one tile is assigned and another core.

The units described herein may be implemented using a hardware component, a software component and/or a combination thereof. A processing device may be implemented using one or more general-purpose or special-purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

A number of examples have been described above. Nevertheless, it should be understood that various modifications may be made to these examples. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A processor-implemented method, comprising:
dividing an input feature map or weight, respectively of a layer of a neural network, into partitions to be assigned to cores in different ways depending on whether an output of a previous layer is forwardable;
generating tiles by dividing each one of the partitions; and
scheduling an operation order of the tiles based on whether values of the input feature map or the weight are shared between the cores.

2. The method of claim 1, wherein dividing of the input feature map or weigh comprises generating the partitions based on a partitioning policy of a layer previous to the layer.

3. The method of claim 1, wherein dividing of the input feature map or weigh comprises:
generating the partitions based on a partitioning policy of the previous layer in response to the output of the previous layer being forwardable; and
generating the partitions by comparing a size of the input feature map of the layer to a size of the weight of the layer in response to the output of the previous layer being unforwardable.

4. The method of claim 3, wherein the generating of the partitions by comparing the size of the input feature map of the layer to the size of the weight of the layer in response to the output of the previous layer being unforwardable comprises generating the partitions by comparing a loss caused by a memory size to a loss caused by unbalance in response to the input feature map or the weight being not uniformly divided and assigned to the cores.

5. The method of claim 1, wherein the generating of the tiles comprises generating the tiles based on a partitioning policy of a layer previous to the layer, a partitioning policy of the layer, or a tile division policy of the previous layer.

6. The method of claim 5, wherein the generating of the tiles comprises:
generating the tiles based on a partitioning policy of a previous layer, a partitioning policy of the layer, and a tile division policy of the previous layer in response to an output of the previous layer being forwardable; and
generating the tiles by comparing a size of the input feature map of the layer to a size of the weight of the layer in response to the output of the previous layer being unforwardable.

7. The method of claim 1, wherein the generating of the partitions comprises dividing the data in a height or width direction of the data.

8. The method of claim 1, wherein the scheduling comprises changing the operation order of the tiles based on whether operation results of the tiles are shared between the cores.

9. The method of claim 8, wherein the changing of the operation order of the tiles comprises changing the operation order so as to operate one tile included in the tiles with priority in response to an operation result of the one tile being shared between a core to which the one tile is assigned and another core.

10. An apparatus, comprising:
a processor configured to:
dividing an input feature map or a weight, respectively of a layer of a neural network, into partitions to be assigned to cores in different ways depending on whether an output of a previous layer is forwardable;
generate tiles by dividing each one of the partitions; and
schedule an operation order of the tiles based on whether values of the input feature map or the weight are shared between the cores.

11. The apparatus of claim 10, wherein, for the generation of the partitions, the processor is further configured to generate the partitions based on a partitioning policy of a layer previous to the layer.

12. The apparatus of claim 10, wherein, for the generation of the partitions, the processor is further configured to generate the tiles based on a partitioning policy of a layer previous to the layer, a partitioning policy of the layer, or a tile division policy of the previous layer.

13. The apparatus of claim 10, wherein the processor is further configured to divide the data in a height or width direction of the data.

14. The apparatus of claim 10, wherein the processor is further configured to change the operation order of the tiles based on whether operation results of the tiles are shared between the cores.

15. The apparatus of claim 14, wherein the processor is further configured to change the operation order so as to operate one tile included in the tiles with priority in response to an operation result of the one tile being shared between a core to which the one tile is assigned and another core.

16. The apparatus of claim 11, wherein, for the generation of the partitions, the processor is further configured to:
generate the partitions based on the partitioning policy of the previous layer in response to an output of the previous layer being forwardable; and
generate the partitions by comparing a size of the input feature map of the layer to a size of the weight of the layer in response to the output of the previous layer being unforwardable.

17. The apparatus of claim 12, wherein, for the generation of the partitions, the processor is further configured to:
generate the tiles based on the partitioning policy of the previous layer, the partitioning policy of the layer, and the tile division policy of the previous layer in response to an output of the previous layer being forwardable; and
generate the tiles by comparing a size of the input feature map of the layer to a size of the weight of the layer in response to the output of the previous layer being unforwardable.

18. An apparatus, comprising:
a receiver configured to receive data on a layer of a neural network; and
a processor configured to:
generate partitions to be assigned to cores by dividing the data;
generate tiles by dividing the partitions; and
schedule an operation order of the tiles based on whether the data are shared between the cores,
wherein, for the generation of the partitions, the processor is further configured to:

generate the partitions based on a partitioning policy of a previous layer in response to an output of the previous layer being forwardable; and generate the partitions by comparing a size of an input feature map of the layer to a size of a weight of the layer in response to the output of the previous layer being unforwardable.

19. The apparatus of claim 18, wherein, for the generation of the partitions, the processor is further configured to generate the partitions by comparing a loss caused by a memory size to a loss caused by unbalance in response to the input feature map or the weight being not uniformly divided and assigned to the cores.

20. An apparatus, comprising:

a receiver configured to receive data on a layer of a neural network; and a processor configured to:

generate partitions to be assigned to cores by dividing the data;

generate tiles by dividing the partitions; and schedule an operation order of the tiles based on whether the data are shared between the cores, wherein, for the generation of the partitions, the processor is further configured to:

generate the tiles based on a partitioning policy of a previous layer, a partitioning policy of the layer, and a tile division policy of the previous layer in response to an output of the previous layer being forwardable; and generate the tiles by comparing a size of an input feature map of the layer to a size of a weight of the layer in response to the output of the previous layer being unforwardable.

\* \* \* \* \*